Figure 1:
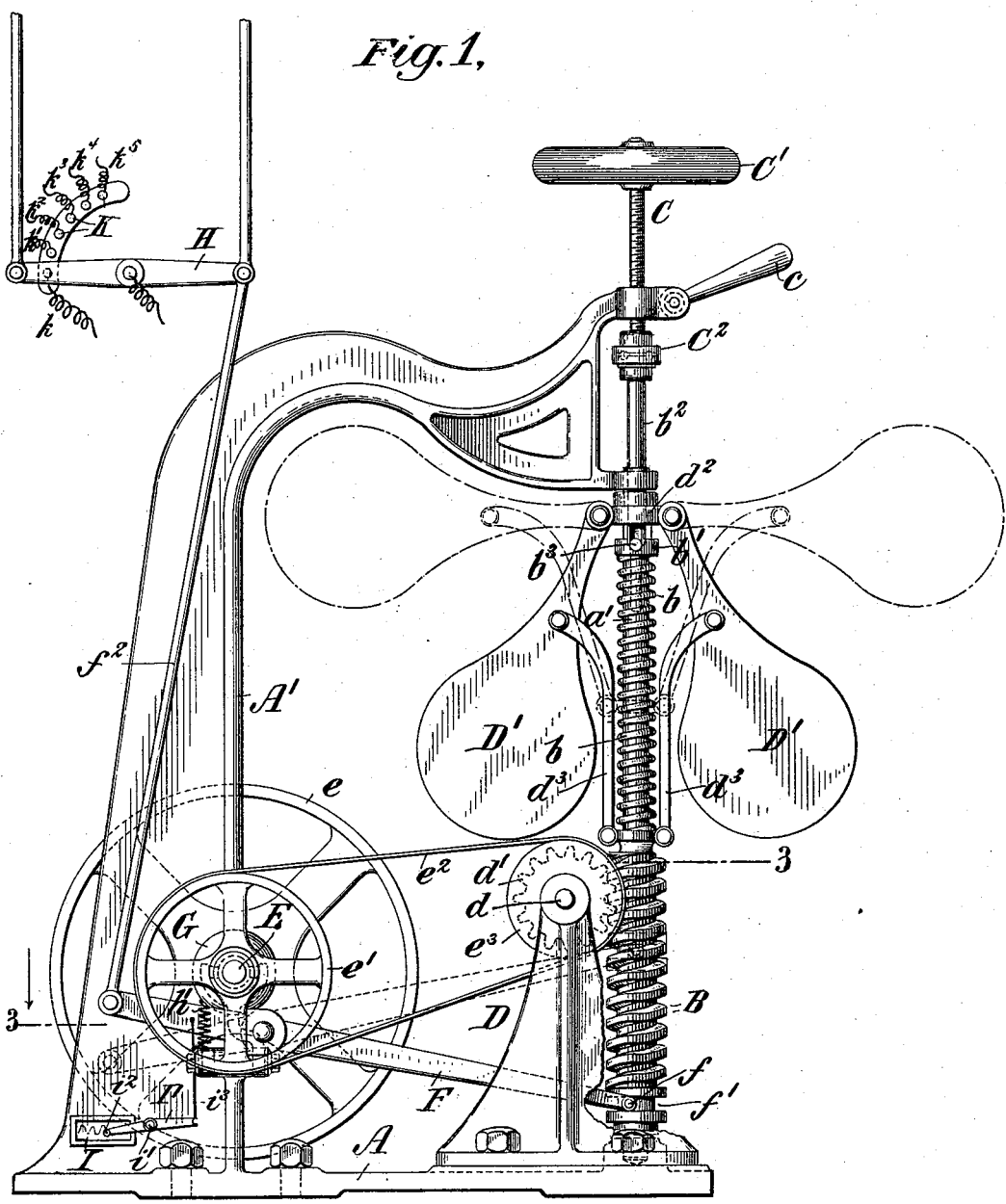

(No Model.)

3 Sheets—Sheet 1.

J. F. RADERS.
NON-CENTRIFUGAL GOVERNOR AND SPEED INDICATOR.

No. 588,655.

Patented Aug. 24, 1897.

WITNESSES:

INVENTOR
Joseph F. Raders
BY
his ATTORNEY (No Model.) 3 Sheets—Sheet 2.

J. F. RADERS.
NON-CENTRIFUGAL GOVERNOR AND SPEED INDICATOR.

No. 588,655. Patented Aug. 24, 1897.

WITNESSES:
D. N. Hayward
H. Coulant

INVENTOR
Joseph F. Raders,
BY E. N. Dickson
his ATTORNEY (No Model.)  3 Sheets—Sheet 3.

J. F. RADERS.
NON-CENTRIFUGAL GOVERNOR AND SPEED INDICATOR.

No. 588,655. Patented Aug. 24, 1897.

WITNESSES:
D. N. Maynord
H. Content

INVENTOR
Joseph F. Raders,
BY E. N. Dickerson
his
ATTORNEY.

UNITED STATES PATENT OFFICE.

JOSEPH F. RADERS, OF FLUSHING, NEW YORK, ASSIGNOR, BY DIRECT AND MESNE ASSIGNMENTS, TO HIMSELF, AND EDWARD N. DICKERSON, OF NEW YORK, N. Y.

NON-CENTRIFUGAL GOVERNOR AND SPEED-INDICATOR.

SPECIFICATION forming part of Letters Patent No. 588,655, dated August 24, 1897.

Application filed November 20, 1896. Serial No. 612,825. (No model.)

*To all whom it may concern:*

Be it known that I, JOSEPH F. RADERS, of Flushing, New York, have invented a certain new and useful Non-Centrifugal Governor and Speed-Indicator, of which the following is a specification.

Governors and regulating devices customarily employed for rendering the movement of steam-engines or other sources of power uniform partake of the movement of the source of power and are dependent for their actions upon centrifugal force, any variation in this latter force as developed usually in one or more rotating masses being utilized to increase or decrease the amount of motive fluid admitted. It is impossible with such centrifugal governors from their very nature to maintain a perfectly steady and uniform velocity, for it is necessary in order to secure an operation of the governor that there should be a sensible change in the speed of the governor and that this change should be fully accomplished, the governor acting only at the termination thereof. The degree of sensitiveness is further reduced by the consideration that the moving parts of the governor in their actions are subject to friction, thereby increasing the magnitude of speed necessary to cause the governor to act. All governors of this class in which there are revolving balls or their equivalent depend for their action upon a change in speed of revolution of the balls or equivalent parts. In the governor which is the subject of the present invention, however, in which I prefer to use a revolving fan having variable surface or resistance in place of the revolving balls, the governing action occurs without any necessary change in the speed of revolution of the fan. Theoretically the fan should continue to move with uniform velocity and the governing action should not disturb that speed of revolution. The present governor therefore differs from the previous type of governors in the fact that it is not necessary or desirable to change that speed of revolution of the revolving governing ball or fan, but the slightest difference in speed of revolution of the engine or the machine to be governed acts upon a moving part intermediate the engine and the governing revolving part, which movement itself performs the governing action.

As will be seen in the study of the mechanism, the speed of revolution of the engine ultimately to be determined is dependent in the form shown upon two conditions, one of which is the tension of the spring upon the sleeve and the other of which is the resistance of the fans revolving at the determined speed. If either the tension of the spring or the size of the fan-blades or their inclination were changed, a resulting difference would be accomplished in the speed of the main engine.

In other words, then, the device consists generally in one revolving part which should have a tendency to have a constant rate of revolution, and in the form shown such rate of revolution can be determined at will by the operator by an adjustment. A second revolving portion is itself driven directly from the mechanism, but the parts are so related as that the speed of revolution of that portion directly driven from the engine is not instantly communicated to the revolving portion of the mechanism, but there is an interval of time or motion between an increased motion of the first mechanism driven from the engine and the second mechanism which is so driven from the first mechanism driven from the engine. I utilize this difference in speed as affording the governing function of my apparatus.

In the form shown, as will be observed, the speed of the engine to be governed is transmitted through a revolving gear-wheel revolving coincident with the motion of the engine to a movable worm-gear, the position of which is controlled by the tension of a spring and the resistance of revolving fans. The result of this combination is that a constant increased motion (and when I say increased I refer likewise to decreased) will not be transmitted instantly or necessarily at all to the fans, for the action of the gear-wheel upon the worm under these conditions is a twofold one. It may either drive the worm at a speed dependent upon the relation of pitch of the worm to the teeth of the gear, or if the motion be suddenly increased then the teeth do not follow the spiral of the worm in driving the worm, but the worm is suddenly raised one or more teeth, owing to the sudden access in speed of the driving mechanism, which raising of the worm does not, however, revolve the worm, but compresses the governing-spring; and it is this function which I utilize in determining the speed of the governed engine. Of course, however, ultimately the increased speed of the engine, if not arrested by the governing action, would communicate itself to the revolving fan. This would occur when the spring had resumed its normal tension with reference to the position of the worm-sleeve upon the shaft. But this tendency of increase in revolution, under these conditions, of the fan is counteracted in the fan itself, which is so constructed as to oppose an increasing resistance to any tendency to drive it faster or a decreased resistance to any tendency to drive it slower. Thus it will be seen that when the worm-wheel revolves faster than the predetermined rate the increased speed of the engine governed will be taken up first by the raising of the worm and then by the increased resistance to rotation of the fans. The worm being connected to the throttle-valve or other means of controlling the motive fluid, the first result of an increase of speed of the engine governed will be a coincident movement of the devices for controlling the flow of the motive fluid. The contrary result, of course, as will be readily seen, would be accomplished, provided the fan was driven at a less velocity. In this case the extension of the governing-spring would be greater and the throttle-valve or governing portion would be opened.

It is, of course, apparent that for the revolving fans any mechanism having a tendency to constant revolution could be substituted, even to some extent a revolving mass of metal, like a gyroscope; but in this case the apparatus would not have within itself the ability to determine the constant rate of revolution at which it is desired that the machine should run, but would have the capacity to prevent sudden variation in such speed only. As will now be seen, therefore, my mechanism has within itself a double capacity of governing. In the first place, it has a capacity of preventing or governing any sudden increase or decrease in speed in the machine without desirably changing the constant speed of revolution of the fan or revolving member, and, in the second place, my mechanism has a capacity of determining adjustably the constant speed at which the mechanism or driving-engine shall run, and it is likewise to be observed that this speed can be readily varied in the governor while the mechanism is in operation.

Figure 2:
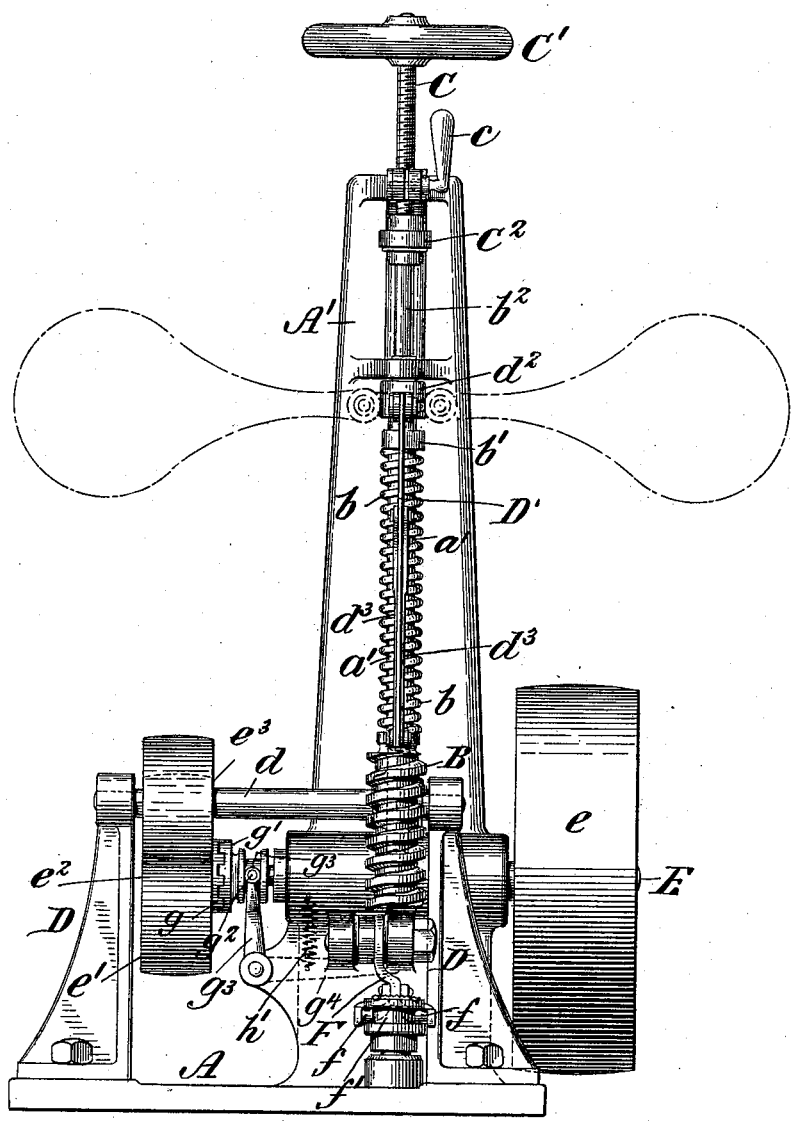
Figure 3:
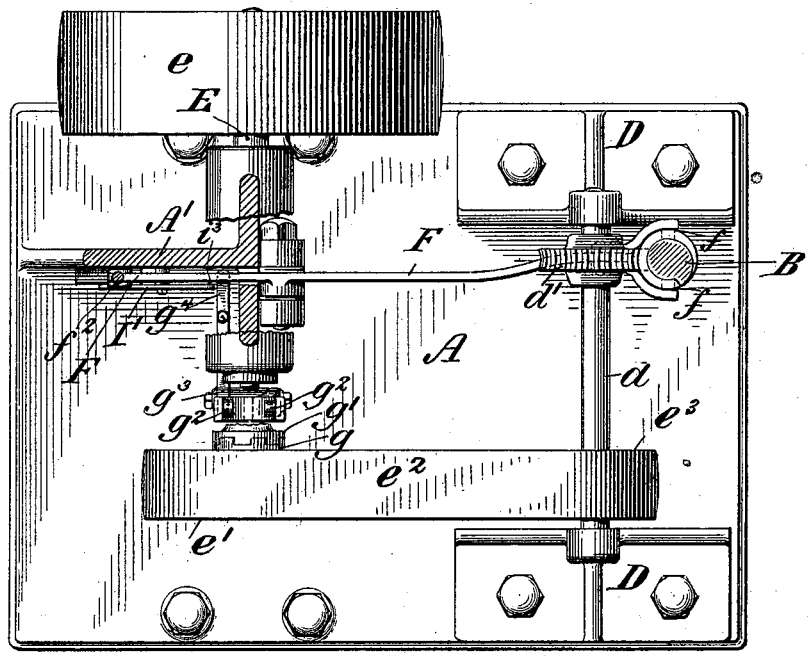

In the present drawings, which represent an embodiment of my invention, Figure 1 is a side elevation of the same. Fig. 2 is a view taken at right angles to that represented in Fig. 1. Fig. 3 is a partial section and a partial plan taken on the lines 3 3 of Fig. 1 and looking in the direction of the arrow.

Similar letters of reference designate corresponding parts in all figures.

A designates a convenient bed-plate upon which the governor mechanism is mounted.

A' indicates an upright or standard extending from the base A and here represented as extending forwardly at its upper part, where it is provided with a journal-bearing $a$ for an upright rotary shaft $a'$, whose lower extremity is journaled in the base-plate A or an appurtenance thereof.

B is a worm fitted to the shaft $a'$ in a manner to be freely movable lengthwise of the latter, but which rotates therewith by means of an ordinary key or keyway construction. The worm is urged to its lowermost position by a spring $b$, interposed between the upper extremity of the worm and a collar $b'$, movable lengthwise of the shaft $a'$. The tension of the spring may be adjusted at will by means of a screw C and hand-wheel C'; the former entering a tapped hole in the upper portion of the upright A', movement being transferred from the extremity of the aforesaid adjusting-screw C and the collar $b'$ by means of a rod $b^2$, which enters the upper recessed extremity of the shaft $a'$ and is provided at its lower extremity with a cross-pin $b^3$, which passes through the transverse slot in the shaft $a'$ and bears upon the collar $b'$. Preferably a frictionless bearing $C^2$ will be provided at the upper extremity of the rod $b^2$.

$c$ is a lever for clamping the screw C in any position to which it may be turned.

D D are bearings erected on the base-plate A and in which there is journaled a shaft $d$, carrying a worm-wheel $d'$, whose teeth engage with the worm B. The pitch of this worm is made sufficiently great to enable the same to be rotated upon its axis by the rotation of the engaging worm-wheel.

It is evident from the inclination of the thread of the worm to the axis of the worm-wheel shaft that upon the forcible rotation of the worm-wheel there is a tendency for the worm to move in two directions—rotarily upon its axis and lengthwise along the shaft $a'$, this latter movement being opposed by the yielding force of the spring $b$.

Fans D' are provided for offering a resistance to the rotation of the worm B. Now it is evident that for any given speed of rotation of the worm-wheel there will be a certain position of the worm B, dependent upon the resistance afforded by the spring $b$. If, however, the circumferential or angular speed of this worm attempts to change, corresponding to a similar attempt on the part of the engine-shaft, &c., the worm B will ascend or descend. To render the magnitude of this longitudinal movement of the worm in exact proportion to the increase or decrease of the circumferential speed of the worm-wheel above or below normal, I pivot the fans D' to a collar $d^2$, rigid with the shaft $a'$, and so connect them with the worm that the position they are caused to assume is dependent upon the position of the worm, they occupying a more nearly horizontal position as the worm moves upward and thus offering an increasing resistance to the rotation of the worm. It is manifest from what has been said that any acceleration or retardation of the worm-wheel will have a tendency to elevate the worm or to permit the same to descend, as well as to cause the worm to rotate more rapidly. By reason of the fact, however, that the fans rise in proportion as the worm rises from a position in which they offer no or little resistance to rotation to positions in which this resistance is constantly increasing, this latter tendency is nullified as to its effect and approximately the entire effort is expended in the elevation of the worm. In other words, this governor may be distinguished from centrifugal governors in this, that in the present form the regulation is accomplished at the beginning of any retardation or acceleration in speed of the source of power, while with centrifugal governors regulation is effected only at the termination of a sensible amount of these variations.

The worm B is connected with the fans $D'$ by the links $d^3$.

E is a shaft journaled in the upright $A'$ and provided with a pulley $e$, driven from the steam-engine or other source of power. Upon the shaft E is also mounted a second pulley $e'$, connected by a driving-belt $e^2$ with a pulley $e^3$, affixed to the shaft $d$.

The amount of steam, compressed air, or other motive fluid admitted to the engine is under the direct control of the worm B by means of a lever F, fulcrumed on a fixture of the upright $A'$ or base-plate A and carrying at its outer extremity studs or pins $f$, which enter an annular groove $f'$ provided in the lower extremity of the worm. The opposite extremity of the lever F may be connected by linkwork $f^2$ with the throttle-valve. (Not deemed necessary here to be shown.)

As a means for protecting the device from injury should the worm rise too high I have interposed between the pulley E, driven from the engine or other source of power, and the driving-pulley $e'$, from which the worm-wheel $d'$ acquires its movement, the clutch G, here shown to be an ordinary jaw-clutch, one of whose members $g$ is rigid with the pulley $e'$, while the other member $g'$ is movable lengthwise of the lever E, but compelled to rotate therewith. This latter member $g'$ is provided with an annular groove into which extend pins $g^2$, projecting from the extremity of one arm $g^3$ of a double-arm pulley, the remaining arm $g^4$ extending below the lever F and in such relation thereto that upon the tilting of the latter lever, due to a dangerous rise of the worm, the same will contact with the arm $g^4$, shifting the same upon its pivot and withdrawing the member $g'$ from engagement with the remaining member $g$ of the clutch G, thereby disengaging the governor.

Of course a governor controlling the supply of steam or other motive fluid is effective only while admission is taking place, since an operation of the governor controlling the throttle will have no effect upon the engine if such operation takes place during expansion after the expansion-valve has been closed. In cases where the engine is of the condensing type—for instance, marine engines—the governor may be used to work not only the throttle-valve to vary the force urging the piston forward, but also a valve controlling the exhaust, and thus effecting an increase or decrease in the resistance offered to the forward piston movement. For this purpose the link $f^2$ may be connected with a fulcrumed lever H, from which the condenser-controlling valve and throttle-valve may be worked. It is of course obvious that in the control of large engines an intermediate cylinder may be used to do the work of regulating the governor itself, merely serving to alter the position of a valve which controls the position of a piston in a cylinder which does the work. Such mechanisms are well known. They are of a class in which the piston follows the movement of the valve.

$h'$ is a spring for drawing the disengaged lever comprising the arms $g^3$ and $g^4$ into a position to maintain the members of the clutch G in engagement. It is furthermore evident that since the worm B is responsive to the speed of the source of power it may be utilized as a means for preserving a record of the speed of the engine. Means are shown in Fig. 1 by which this may be accomplished.

I indicates a paper record-strip driven by clockwork or otherwise.

$I'$ is a lever fulcrumed intermediate of its ends at $i'$, to one extremity of which there is secured a suitable marker $i^2$, while its opposite extremity is mechanically connected with the lever F, as by a link $i^3$. The lever $I'$ is moved, therefore, in correspondence to the movement of the lever F, and these changes in position are recorded on the paper strip or ribbon at $I'$.

The position of the worm at any instant depending upon the speed at which the engine is running, it may be taken as indicating approximately the speed at which the vessel or locomotive is moving, and if the instrument is calibrated from the record it makes the distance traveled may be ascertained.

I have described the device thus far and referred to it as applicable to the control of the motive fluid admitted to a steam-engine or other source of power, but its use is not necessarily limited to such a purpose, as the principle embodied may be employed as a basis for the control of clockwork mechanism. For instance, the worm-wheel $d'$ may be driven direct from such mechanism, and the rise and fall of the worm corresponding to an increase or a decrease of the load upon the motor-shaft from which power is derived will serve to increase or decrease the resistance to rotation offered by the fans in inverse proportion to the varying load. Furthermore, as the tension on the driving-spring of the motor decreases the fans will gradually lower to compensate for the reduction in driving power, thus tending to maintain a uniform velocity.

The invention may also be applied to the control of a dynamo-electric machine, the movement of the lever F operating to throw in and out magnetizing-coils or resistance, as shown in Fig. 1, where K represents a number of insulated contact-pieces in electrical communication with the wires $k$ $k'$ $k^2$ $k^3$, &c., in this instance by the lever H and a finger-piece carried and playing over these pieces, this arrangement being sufficiently well known to need no further description.

Having described my invention, what I consider as new, and desire to secure by Letters Patent, is—

1. In a governor, the combination of a moving element constituting a resistance, a driving member, an intermediate element transmitting power from the driving member to the first element, variations in speed of the driving member simultaneously effecting variations in resistance to movement of the first element, and means connected to said intermediate element for controlling the motive fluid, substantially as specified.

2. In a governor, the combination of an element moving at a rate substantially corresponding to the rate of movement at which the engine governed shall run, a second element driven by and partaking of the variations in speed of the engine governed, and an intermediate element transmitting motion from the second element to the first element, said intermediate element having two movements, one coincident with the first element, and another resulting from the variations in speed of the engine governed, the movement resulting from the variations in speed of the engine governed simultaneously effecting variations in the resistance to movement of the first element, substantially as specified.

3. In a governor, the combination of an element moving for a given regulation at a predetermined rate substantially corresponding to a predetermined rate of movement of the engine governed, a second element driven by and partaking of the variations in speed of the engine governed, and an intermediate element transmitting motion from the second element to the first element, said intermediate element having two movements, one coincident with the first element, and another resulting from the variations in speed of the engine governed, the movement resulting from the variations in speed of the engine governed simultaneously effecting variations in the resistance to movement of the first element, substantially as specified.

4. In a governor, the combination of an element constantly moving for a given regulation at a predetermined rate substantially corresponding to a predetermined rate of movement of the engine governed, a second element driven by and partaking of the variations in speed of the engine governed, an intermediate element transmitting motion from the second element to the first element, said intermediate element having two movements, one coincident with the first element and another resulting from variations in speed of the engine governed, the movement resulting from the variations in speed of the engine governed simultaneously effecting variations in the resistance to movement of the first element, and means acting upon said intermediate element to control a predetermined rate of movement substantially as specified.

5. A governor having a rotating member having a normal speed, means for varying the resistance to rotation offered by the rotating member at its normal speed, a second mechanism moving coincident with the variable speed of the engine, and an intermediate driving connection between the driving and the driven member transmitting power from the driving to the driven member, variations in speed of the engine governed simultaneously operating through the intermediate connection to effect variations in the resistance to rotation of the rotating member, substantially as specified.

6. A governor having a rotating member having a normal speed, means for varying the resistance to rotation offered by the rotating member at its normal speed, a second mechanism moving coincident with the variable speed of the engine, an intermediate driving connection between the driving and the driven member transmitting the power from the driving to the driven member, variations in speed of the engine governed simultaneously operating through the intermediate connection to effect variations in the resistance to rotation of the rotating member, and a spring acting upon said intermediate member, substantially as specified.

7. A governor having a rotating member having a normal speed, means for varying the resistance to rotation offered by the rotating member at its normal speed, a second mechanism moving coincident with the variable speed of the engine, an intermediate driving connection between the driving and the driven member transmitting power from the driving to the driven member, variations in speed of the engine governed simultaneously operating through the intermediate connection to effect variations in the resistance to rotation of the rotating member, and an adjustable spring acting upon said intermediate member, substantially as specified.

8. In a governor the combination of a rotary element, a second element driven by and partaking of variations in speed of the engine governed, a rotary and lengthwise-movable element driven by the second element and operating the rotary element, means for varying the resistance to rotation of the rotary and lengthwise-movable element, variations in speed of the engine governed operating to simultaneously effect variations in the resistance to rotation of the rotary and lengthwise-movable element, and means actuated from the rotary and lengthwise-movable element for controlling the motive fluid admitted to the engine or other source of power governed, substantially as specified.

9. In a governor, the combination of a rotary element, a second element driven by and partaking of variations in speed of the engine governed, a rotary and lengthwise-movable element driven by the second element and operating the rotary element, means for varying the resistance to rotation of the rotary and lengthwise-movable element, variations in speed of the engine governed operating to simultaneously effect variations in the resistance to rotation of the rotary and lengthwise-movable element, means actuated by the rotary and lengthwise-movable element for controlling the motive fluid admitted to the engine or other source of power governed, and means for rendering the rotary movement of the rotary and lengthwise-movable element substantially invariable from a predetermined rate, substantially as specified.

10. The combination of a worm-wheel, a rotary and lengthwise-movable worm, pivoted fans, means connecting said fans with the worm whereby the position of the fans is determined by the position of the worm, and means actuated by said worm for controlling the motive fluid to the engine or other source of power governed, substantially as specified.

11. The combination of a worm-wheel, a rotary and lengthwise-movable worm, a spring urging said worm in one direction, pivoted fans, means connecting said fans with the worm whereby the position of said fans is determined by the position of the worm, and means actuated by said worm for controlling the motive fluid to the engine or other source of power governed, substantially as specified.

12. The combination of a worm-wheel, a rotary and lengthwise-movable worm, a spring urging the worm in one direction, means for adjusting the tension of the spring, pivoted fans, means connecting said fans with the worm whereby the position of the fans is determined by the position of the worm, and means actuated by said worm for controlling the motive fluid to the engine or other source of power governed, substantially as specified.

13. The combination of a worm-wheel, a rotary and lengthwise-movable worm yieldingly held in position against the resistance of the worm-wheel, pivoted fans, links connecting said fans with the worm whereby the position of the fans is determined by the position of the worm, and means actuated by said worm for controlling the motive fluid to the engine or other source of power governed, substantially as specified.

14. The combination of a lengthwise-movable worm, a worm-wheel engaging therewith, means for increasing or decreasing the resistance to rotation of the worm in proportion to the increase or decrease of effort exerted by the worm-wheel, and means actuated by said worm for controlling the motive fluid to the engine or other source of power governed, substantially as specified.

15. In a governor, the combination of an element constantly rotating for a given regulation at a predetermined rate corresponding to the rate at which the engine governed shall run, a second element moving variably with the varying speed of the engine, and an intermediate element transmitting power from the second element to the rotary element and having a rotary movement coincident with the rotary element, substantially as specified.

16. In a governor, the combination of an element constantly rotating for a given regulation at a predetermined rate corresponding to the rate at which the engine governed shall run, a second element moving variably with the varying speed of the engine, an intermediate element transmitting power from the second element to the rotary element and having a rotary movement coincident with the rotary element, and a traveling strip upon which may be recorded the positions assumed by the intermediate element, substantially as specified.

17. The combination of a lengthwise-movable worm and a wheel for driving the same, means for increasing the resistance to rotation offered by the worm when the latter moves lengthwise in one direction and for producing the opposite effect when the worm moves in the opposite direction, and a traveling strip upon which the positions assumed by the worm are recorded, substantially as specified.

18. The combination in a governor, of a lengthwise-movable worm whose movement serves to control the speed of the device governed, a worm-wheel for driving the same, and a safety device for disengaging the worm when the same has taken an abnormal position, substantially as specified.

19. The combination in a governor, of a lengthwise-movable worm, a worm-wheel engaging therewith and driven from the device governed, and means brought into action when the worm has assumed an abnormal position for disengaging the worm-wheel from the device governed, substantially as specified.

In testimony whereof I have signed my name to this specification in the presence of two subscribing witnesses.

JOSEPH F. RADERS.

Witnesses:
H. COUTANT,
W. LAIRD GOLDSBOROUGH.